United States Patent
Zhang

(10) Patent No.: US 12,223,167 B2
(45) Date of Patent: Feb. 11, 2025

(54) METHOD, APPARATUS, AND DEVICE FOR CLEANING RESIDUAL PATHS ON HOST END, AND STORAGE MEDIUM

(71) Applicant: INSPUR SUZHOU INTELLIGENT TECHNOLOGY CO., LTD., Jiangsu (CN)

(72) Inventor: Zhenguang Zhang, Jiangsu (CN)

(73) Assignee: INSPUR SUXHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,219

(22) PCT Filed: Oct. 29, 2021

(86) PCT No.: PCT/CN2021/127521
§ 371 (c)(1),
(2) Date: Jun. 29, 2023

(87) PCT Pub. No.: WO2023/284174
PCT Pub. Date: Jan. 19, 2023

(65) Prior Publication Data
US 2024/0061573 A1    Feb. 22, 2024

(30) Foreign Application Priority Data
Jul. 12, 2021  (CN) .......................... 202110784141.7

(51) Int. Cl.
*G06F 3/06* (2006.01)

(52) U.S. Cl.
CPC .......... *G06F 3/0604* (2013.01); *G06F 3/0635* (2013.01); *G06F 3/067* (2013.01)

(58) Field of Classification Search
CPC ...... G06F 3/0604; G06F 3/0635; G06F 3/067; G06F 3/0671; G06F 3/0605; G06F 3/0629
See application file for complete search history.

(56) References Cited

U.S. PATENT DOCUMENTS

| | | | |
|---|---|---|---|
| 6,725,295 B2 * | 4/2004 | Iwatani | H04L 41/06 714/48 |
| 2003/0055943 A1 * | 3/2003 | Kanai | G06F 3/067 709/223 |

(Continued)

FOREIGN PATENT DOCUMENTS

| | | |
|---|---|---|
| CN | 104423889 A | 3/2015 |
| CN | 111352899 A | 6/2020 |

(Continued)

*Primary Examiner* — Zhuo H Li
(74) *Attorney, Agent, or Firm* — IPro, PLLC

(57) ABSTRACT

Provided is a method for cleaning residual paths on a host end, including: acquiring device information of subordinate devices of a plurality of paths; determining, according to the device information, whether links corresponding to the subordinate devices are all abnormal; acquiring a global identification number and connection information of each subordinate device in a case that the links corresponding to the subordinate devices are all abnormal; when the global identification number is not null and the connection information is successfully acquired, querying a mapping state of a volume corresponding to the global identification number and a mapped host according to the global identification number and the connection information; and when the volume is not in the mapping state or the mapped host is not a target host, deleting the plurality of paths and the subordinate devices.

20 Claims, 2 Drawing Sheets

(56) References Cited

U.S. PATENT DOCUMENTS

2020/0074409 A1   3/2020  Liu et al.
2022/0171567 A1*  6/2022  Matosevich .......... G06F 3/0653
2022/0357851 A1* 11/2022  Basu .................... G06F 3/0605
2023/0195325 A1*  6/2023  Xuan ................... G06F 3/0635
                                                         711/154

FOREIGN PATENT DOCUMENTS

| CN | 111901399 A | 11/2020 |
| CN | 111988169 A | 11/2020 |
| CN | 113238719 A | 8/2021 |

* cited by examiner

METHOD, APPARATUS, AND DEVICE FOR CLEANING RESIDUAL PATHS ON HOST END, AND STORAGE MEDIUM

The present application claims the priority of the Chinese patent application filed on Jul. 12, 2021 with the application number of 202110784141.7 and the title of "METHOD, APPARATUS, AND DEVICE FOR CLEANING RESIDUAL PATHS ON HOST END", which is incorporated herein in its entirety by reference.

TECHNICAL FIELD

The present application relates to the technical field of storage and, more particularly, to a method for cleaning residual paths on a host end, and in more particular to an apparatus and device for cleaning residual paths on a host end, and a non-transitory computer-readable storage medium.

BACKGROUND

After a storage system is connected to a host, a volume may be mapped to the host to provide a storage space for the host. The host may find, by scanning, a device corresponding to the volume. In a case that there are a plurality of links, each volume corresponds to a plurality of devices. In order to ensure the high availability of paths, multipath software is generally installed on the host, and the multi-path software may aggregate the plurality of devices into a multi-path. The aggregated multi-path is formatted according to a specified file system type, and is then hooked to a specified directory, and thus, a user may use the stored volume normally. When the user no longer uses the stored volume, firstly, the specified directory is removed from the host, then, the multi-path and the devices are deleted from the host, and finally, demapping is performed on storage.

Demapping through normal steps will not cause the multi-path and device residues. However, in a case that improper operation is performed by the user, only demapping on storage without deleting the multi-path and the devices from the host will cause the multi-path and device residues. For the plurality of residual path and devices, an existing solution is to manually delete the multi-path and the devices. However, the manual deletion of the multi-path and the devices not only increases the manual workload, but also causes certain risks. The manual deletion is based on a device state which is failed, that is, the multi-path and the devices are deleted when the device state is failed. However, when the device state is failed, it is also possible that the links are abnormal temporarily (which will be automatically restored later), but are not demapped on storage. Once the devices are deleted, the links are difficult to recover, which seriously affects user's services.

SUMMARY

An objective of the present application is to provide a method for cleaning residual paths on a host end, by which the residual paths on the host end may be safely and reliably cleaned. The other objective of the present application is to provide an apparatus and device for cleaning residual paths on a host end, and a non-transitory computer-readable storage medium, all of which have the above-mentioned technical effects.

In order to solve the above-mentioned technical problems, the present application provides a method for cleaning residual paths on a host end, including:
  acquiring device information of subordinate devices of a plurality of paths;
  determining, according to the device information, whether links corresponding to the subordinate devices are all abnormal;
  acquiring a global identification number and connection information of each subordinate device in a case that the links corresponding to the subordinate devices are all abnormal;
  when the global identification number is not null and the connection information is successfully acquired, querying a mapping state of a volume corresponding to the global identification number and a mapped host according to the global identification number and the connection information; and
  when the volume is not in the mapping state or the mapped host is not a target host, deleting the plurality of paths and the subordinate devices.

In an embodiment of the present application, the step of acquiring device information of subordinate devices of a plurality of paths includes:
  acquiring device states of the subordinate devices of the plurality of paths.

In an embodiment of the present application, the step of acquiring device information of subordinate devices of a plurality of paths includes:
  acquiring small computer system interface (SCSI) protocol identifiers of the subordinate devices of the plurality of paths.

In an embodiment of the present application, the step of determining, according to the device information, whether links corresponding to the subordinate devices are all abnormal includes:
  determining whether the device states of the subordinate devices are all abnormal;
  in a case that the device states of the subordinate devices are all abnormal, determining that the links corresponding to the subordinate devices are all abnormal; and
  in a case that the device states of the subordinate devices are not all abnormal, determining that the links corresponding to the subordinate devices are not all abnormal.

In an embodiment of the present application, the step of determining, according to the device information, whether links corresponding to the subordinate devices are all abnormal includes:
  determining whether the SCSI protocol identifiers of the subordinate devices are all null;
  in a case that the SCSI protocol identifiers of the subordinate devices are all null, determining that the links corresponding to the subordinate devices are all abnormal; and
  in a case that the SCSI protocol identifiers of the subordinate devices are not all null, determining that the links corresponding to the subordinate devices are not all abnormal.

In an embodiment of the present application, the method further includes:
  when the global identification number is null or the connection information is not successfully acquired, ending a process of cleaning residual paths on a host end.

In an embodiment of the present application, before the step of acquiring device information of subordinate devices of a plurality of paths, the method further includes:

acquiring manufacturer information of the subordinate devices;

determining, according to the manufacturer information, whether a supplier of the subordinate devices is a target supplier;

in a case that the supplier of the subordinate devices is the target supplier, performing the step of acquiring device information of subordinate devices of a plurality of paths and subsequent steps; and in a case that the supplier of the subordinate devices is not the target supplier, ending the process of cleaning residual paths on a host end.

In order to solve the above-mentioned technical problems, the present application further provides an apparatus for cleaning residual paths on a host end, including:

a first acquisition module configured to acquire device information of subordinate devices of a plurality of paths;

a determination module configured to determine, according to the device information, whether links corresponding to the subordinate devices are all abnormal;

a second acquisition module configured to acquire a global identification number and connection information of each subordinate device in a case that the links corresponding to the subordinate devices are all abnormal;

a query module configured to, when the global identification number is not null and the connection information is successfully acquired, query a mapping state of a volume corresponding to the global identification number and a mapped host according to the global identification number and the connection information; and a deletion module configured to, when the volume is not in the mapping state or the mapped host is not a target host, delete the plurality of paths and the subordinate devices.

In order to solve the above-mentioned technical problems, the present application further provides a device for cleaning residual paths on a host end, including:

a memory configured to store a computer program; and a processor configured to implement, when executing the computer program, the steps of the method for cleaning residual paths on a host end according to any one mentioned above.

In order to solve the above-mentioned technical problems, the present application further provides a non-transitory computer-readable storage medium, wherein the non-transitory computer-readable storage medium, having stored thereon, a computer program when, when executed by a processor, implements the steps of the method for cleaning residual paths on a host end according to any one mentioned above.

The method for cleaning residual paths on a host end in the present application includes: acquiring device information of subordinate devices of a plurality of paths; determining, according to the device information, whether links corresponding to the subordinate devices are all abnormal; acquiring a global identification number and connection information of each subordinate device in a case that the links corresponding to the subordinate devices are all abnormal; when the global identification number is not null and the connection information is successfully acquired, querying a mapping state of a volume corresponding to the global identification number and a mapped host according to the global identification number and the connection information; and when the volume is not in the mapping state or the mapped host is not a target host, deleting the plurality of paths and the subordinate devices.

Therefore, according to the method for cleaning residual paths on a host end in the present application, when it is determined that the links of the subordinate devices of the plurality of paths are abnormal, the mapping state of the volume and the mapped host are further queried from the storage system, and the plurality of paths and the subordinate devices are deleted only when it is determined that the volume is not in the mapping state or even if the volume is in the mapping state, the mapped host is not the target host, and thus, false deletion caused by temporary link failure may be avoided, and the safety and reliability of deleting the plurality of paths and the subordinate devices are ensured.

All of the apparatus and device for cleaning residual paths on a host end, and the non-transitory computer-readable storage medium provided by the present application have the above-mentioned technical effects.

BRIEF DESCRIPTION OF THE DRAWINGS

In order to describe the technical solutions in the embodiments of the present application more clearly, the accompanying drawings required for describing the prior art or the embodiments will be briefly introduced below. Apparently, the accompanying drawings in the following description show only some embodiments of the present application, and those of ordinary skill in the art may still derive other accompanying drawings from these accompanying drawings without creative efforts.

DETAILED DESCRIPTION OF THE EMBODIMENTS

A core of the present application are to provide a method for cleaning residual paths on a host end, by which the residual paths on the host end may be safely and reliably cleaned. The other core of the present application is to provide an apparatus and device for cleaning residual paths on a host end, and a non-transitory computer-readable storage medium, all of which have the above-mentioned technical effects.

In order to make objectives, technical solutions and advantages of the embodiments of the present application clearer, the technical solutions in the embodiments of the present application will be described clearly and completely below in conjunction with the accompanying drawings in the embodiments of the present application. Apparently, the described embodiments are a part of the embodiments of the present application, not all the embodiments. Based on the described embodiments of the present application, all other embodiments obtained by those of ordinary skill in the art without creative efforts shall fall within the protection scope of the present application.

Figure 1:
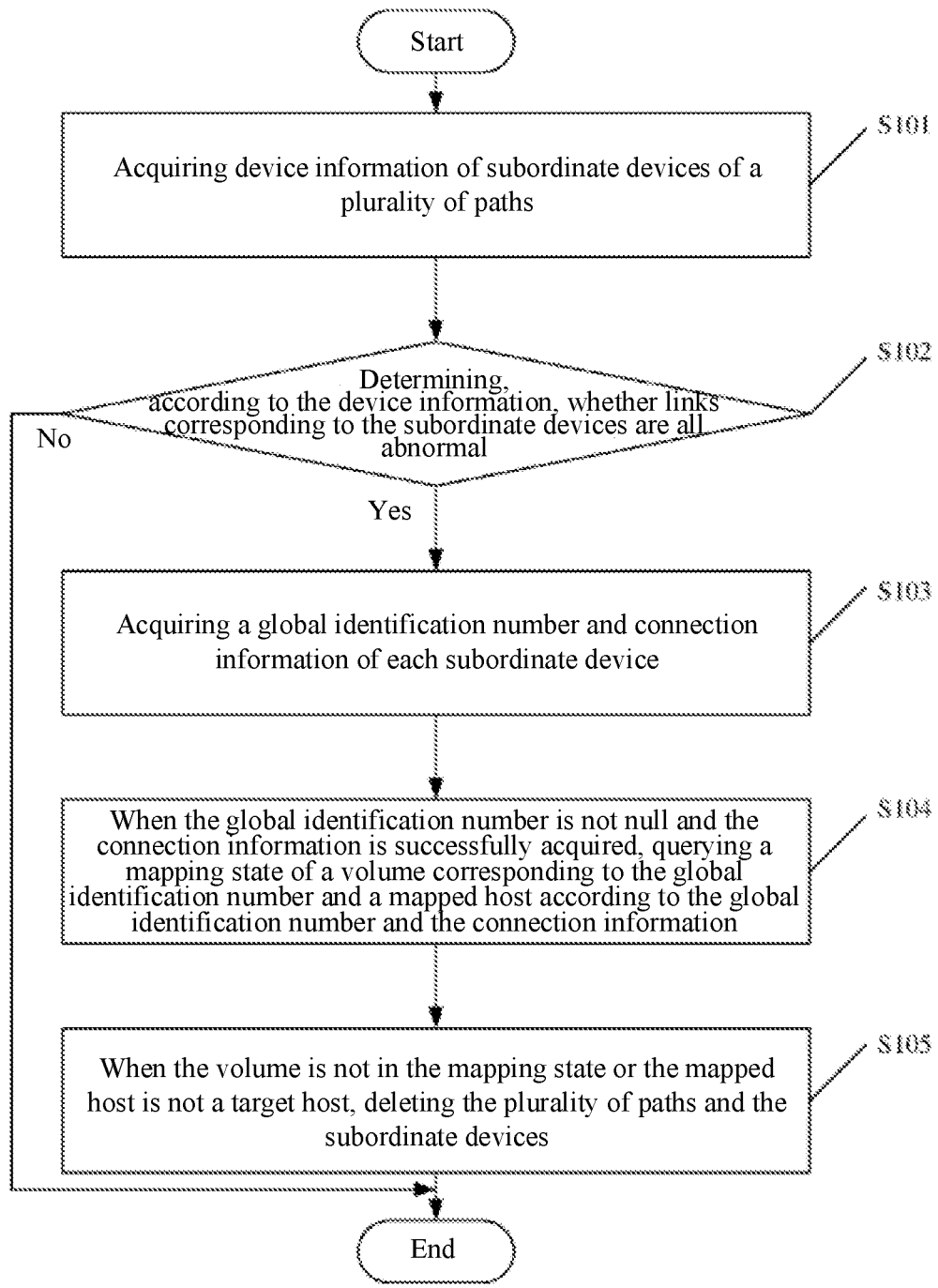
FIG. 1 is a schematic flow diagram of a method for cleaning residual paths on a host end according to an embodiment of the present application.

Refer to FIG. 1 which is a schematic flow diagram of a method for cleaning residual paths on a host end according to an embodiment of the present application. As shown in FIG. 1, the method includes:

S101: device information of subordinate devices of a plurality of paths is acquired.

S102: it is determined, according to the device information, whether links corresponding to the subordinate devices are all abnormal.

According to some embodiments, a plurality of paths and device information of subordinate devices of the plurality of paths are acquired from a host. After the device information of the subordinate devices is acquired, it is determined, according to the device information, whether links corresponding to the subordinate devices are all abnormal.

The acquired device information of the subordinate devices is information capable of reflecting link states of the subordinate devices. Specific contents of the acquired device information are not limited to be unique in the present application as long as the link states of the subordinate devices may be reflected.

In some implementations, the step that device information of subordinate devices of a plurality of paths is acquired includes: device states of the subordinate devices of the plurality of paths are acquired. Correspondingly, the step that it is determined, according to the device information, whether links corresponding to the subordinate devices are all abnormal includes: it is determined whether the device states of the subordinate devices are all abnormal; in a case that the device states of the subordinate devices are all abnormal, it is determined that the links corresponding to the subordinate devices are all abnormal; and in a case that the device states of the subordinate devices are not all abnormal, it is determined that the links corresponding to the subordinate devices are not all abnormal.

According to some embodiments, the acquired device information of the subordinate devices in the present embodiment is the device states of the subordinate devices. In a case that the device states of the subordinate devices are all failed, that is, they are all abnormal, it is proven that the links corresponding to the subordinate devices are all abnormal, at the moment, subsequent steps S103, S104 and S105 are further preformed. In a case that the device states of the subordinate devices are not all failed, that is, they are not all abnormal, it is proven that the links corresponding to the subordinate devices are not all abnormal, at the moment, the plurality of paths may be further used, subsequent steps S103, S104 and S105 are no longer preformed, and a process of cleaning residual paths on a host end is directly ended.

For example, a multipath/dev/dm-2 is acquired by a command multipath-11/dev/dm-*, and the multipath/dev/dm-2 includes two subordinate devices/dev/sdb and/dev/sdc. In a case that a device state of the subordinate device/dev/sdb and a device state of the subordinate device/dev/sdc are both failed, a link corresponding to the subordinate device/dev/sdb and a link corresponding to the subordinate device/dev/sdc are both abnormal; and in a case that the device state of any one of the subordinate device/dev/sdb and the subordinate device/dev/sdc is not failed, the link corresponding to the subordinate device/dev/sdb and the link corresponding to the subordinate device/dev/sdc are not both abnormal.

In some implementations, the step that device information of subordinate devices of a plurality of paths is acquired includes: small computer system interface (SCSI) protocol identifiers of the subordinate devices of the plurality of paths are acquired. Correspondingly, the step that it is determined, according to the device information, whether links corresponding to the subordinate devices are all abnormal includes: it is determined whether the device states of the subordinate devices are all abnormal; in a case that the device states of the subordinate devices are all abnormal, it is determined that the links corresponding to the subordinate devices are all abnormal; and in a case that the device states of the subordinate devices are not all abnormal, it is determined that the links corresponding to the subordinate devices are not all abnormal.

According to some embodiments, the acquired device information of the subordinate devices in the present embodiment is the SCSI protocol identifiers, i.e., scsi_id, of the subordinate devices. In a case that the SCSI protocol identifiers of the subordinate devices are all null, it is proven that the links corresponding to the subordinate devices are all abnormal, at the moment, subsequent steps S103, S104 and S105 are further preformed. In a case that the SCSI protocol identifiers of the subordinate devices are not all null, it is proven that the links corresponding to the subordinate devices are not all abnormal, at the moment, the plurality of paths may be further used, subsequent steps S103, S104 and S105 are no longer preformed, and a process of cleaning residual paths on a host end is directly ended.

For example, an SCSI protocol identifier of a subordinate device/dev/sd* is acquired by a command/lib/udev/scsi_id--whitelisted-page=0x83-device=/dev/sd*. In a case that an SCSI protocol identifier of the subordinate device/dev/sdb and an SCSI protocol identifier of the subordinate device/dev/sdc are both null, a link corresponding to the subordinate device/dev/sdb and a link corresponding to the subordinate device/dev/sdc are both abnormal; and in a case that the SCSI protocol identifier of any one of the subordinate device/dev/sdb and the subordinate device/dev/sdc is not null, the link corresponding to the subordinate device/dev/sdb and the link corresponding to the subordinate device/dev/sdc are not both abnormal.

In some implementations, the step that device information of subordinate devices of a plurality of paths is acquired includes: device states and SCSI protocol identifiers of the subordinate devices of the plurality of paths are acquired. Correspondingly, the step that it is determined, according to the device information, whether links corresponding to the subordinate devices are all abnormal includes: it is determined whether the device states of the subordinate devices are all abnormal and the SCSI protocol identifiers of the subordinate devices are all null; and in a case that the device states of the subordinate devices are all abnormal and the SCSI protocol identifiers of the subordinate devices are all null, it is determined that the links corresponding to the subordinate devices are all abnormal.

According to some embodiments, the acquired device information of the subordinate devices in the present embodiment includes the device states and the SCSI protocol identifiers of the subordinate devices. In a case that the device states of the subordinate devices are not all failed, it is proven that the links corresponding to the subordinate devices are not all abnormal, at the moment, subsequent processes are directly ended. In a case that the device states of the subordinate devices are all failed, and the SCSI protocol identifiers of the subordinate devices are all null, it is proven that the links corresponding to the subordinate devices are all abnormal. By integrating the device states and the SCSI protocol identifiers of the subordinate devices, the states of the links of the subordinate devices may be determined more reliably.

S103: a global identification number and connection information of each subordinate device are acquired in a case that the links corresponding to the subordinate devices are all abnormal.

S104: when the global identification number is not null and the connection information is successfully acquired, a mapping state of a volume corresponding to the global identification number and a mapped host are queried according to the global identification number and the connection information.

According to some embodiments, when it is determined that the links corresponding to the subordinate devices are all abnormal, a global identification number, i.e., WWID and connection information of each subordinate device are further acquired. For example, a global identification number of a subordinate device/dev/sd* is acquired by a command lsblk-o serial/dev/sd*, and connection information, i.e., target, portal and scsi_id, corresponding to the subordinate device/dev/sd* is acquired by querying a directory/dev/disk/by_path/.

In a case that the global identification number of the subordinate device is not null, it is proven that the device is a volume from a certain storage system (at least it is once). In a case that the global identification number of the subordinate device is null, it is proven that the device is not a volume from a certain storage system. In a case that the connection information is successfully acquired, it may be known which storage system the device is from. In a case that the connection information is not successfully acquired, it may not be known which storage system the device is from.

Therefore, when the global identification number is not null and the connection information is successfully acquired, the mapping state of the volume corresponding to the global identification number and the mapped host are queried from a specified storage system according to the global identification number and the connection information. When the global identification number is null and the connection information is not successfully acquired, a process of cleaning residual paths on a host end is directly ended.

S105: when the volume is not in the mapping state or the mapped host is not a target host, the plurality of paths and the subordinate devices are deleted.

According to some embodiments, the target host refers to a host performing the above-mentioned steps and requiring to clean the residual paths. In a case that the volume corresponding to the global identification number of the subordinate device is not in the mapping state, or the volume corresponding to the global identification number of the subordinate device is in the mapping state, but the mapped host is not the target host, it is proven that the links are permanently abnormal and may not be automatically recovered later, at the moment, the plurality of paths may be deleted by a command multipath-f/dev/dm-*, and the subordinate devices may be deleted by a command echo 1>/sys/block/sd*/device/delete. In a case that the volume corresponding to the global identification number of the subordinate device is in the mapping state, and the mapped host is the target host, it is proven that the links are temporarily abnormal and may be automatically recovered later, at the moment, the plurality of paths and the subordinate devices are not deleted.

Further, in some implementations, before the step that device information of subordinate devices of a plurality of paths is acquired, the method further includes: manufacturer information of the subordinate devices is acquired; it is determined, according to the manufacturer information, whether a supplier of the subordinate devices is a target supplier; in a case that the supplier of the subordinate devices is the target supplier, the step that device information of subordinate devices of a plurality of paths is acquired and subsequent steps are performed; and in a case that the supplier of the subordinate devices is not the target supplier, the process of cleaning residual paths on a host end is ended.

According to some embodiments, manufacturer information of a subordinate device/dev/sd* is acquired by a command lsblk-l-S-o+UUID/dev/sd*. In a case that the manufacturer information of the subordinate device is a target supplier, step S101 and subsequent steps are performed. In a case that the manufacturer information of the subordinate device is not the target supplier, step S101 and subsequent steps are no longer performed.

For example, the target supplier is Inspur. In a case that a supplier of a subordinate device is Inspur, step S101 and subsequent steps are performed. In a case that the supplier of the subordinate device is not Inspur, step S101 and subsequent steps are no longer performed.

In conclusion, according to the method for cleaning residual paths on a host end in the present application, when it is determined that the links of the subordinate devices of the plurality of paths are abnormal, the mapping state of the volume and the mapped host are further queried from the storage system, and the plurality of paths and the subordinate devices are deleted only when it is determined that the volume is not in the mapping state or even if the volume is in the mapping state, the mapped host is not the target host, and thus, false deletion caused by temporary link failure may be avoided, and the safety and reliability of deleting the plurality of paths and the subordinate devices are ensured.

Figure 2:
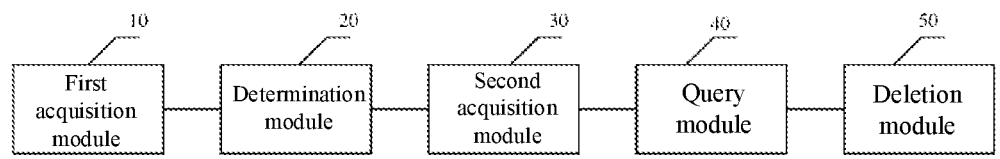
FIG. 2 is a schematic diagram of an apparatus for cleaning residual paths on a host end according to an embodiment of the present application.

The present application further provides an apparatus for cleaning residual paths on a host end, and the apparatus in the following description may refer to the method described above. Refer to FIG. 2 which is a schematic diagram of an apparatus for cleaning residual paths on a host end according to an embodiment of the present application. As shown in FIG. 2, the apparatus includes:
- a first acquisition module 10 configured to acquire device information of subordinate devices of a plurality of paths;
- a determination module 20 configured to determine, according to the device information, whether links corresponding to the subordinate devices are all abnormal;
- a second acquisition module 30 configured to acquire a global identification number and connection information of each subordinate device in a case that the links corresponding to the subordinate devices are all abnormal;
- a query module 40 configured to, when the global identification number is not null and the connection information is successfully acquired, query a mapping state of a volume corresponding to the global identification number and a mapped host according to the global identification number and the connection information; and
- a deletion module 50 configured to, when the volume is not in the mapping state or the mapped host is not a target host, delete the plurality of paths and the subordinate devices.

On the basis of the above-mentioned embodiment, the first acquisition module 10 is configured to:
- acquire device states of the subordinate devices of the plurality of paths.

On the basis of the above-mentioned embodiment, the first acquisition module 10 is configured to:
    acquiring SCSI protocol identifiers of the subordinate devices of the plurality of paths.

On the basis of the above-mentioned embodiment, the determination module 20 is configured to:
    determine whether the device states of the subordinate devices are all abnormal;
    in a case that the device states of the subordinate devices are all abnormal, determine that the links corresponding to the subordinate devices are all abnormal; and
    in a case that the device states of the subordinate devices are not all abnormal, determine that the links corresponding to the subordinate devices are not all abnormal.

On the basis of the above-mentioned embodiment, the determination module is configured to:
    determine whether the SCSI protocol identifiers of the subordinate devices are all null;
    in a case that the SCSI protocol identifiers of the subordinate devices are all null, determine that the links corresponding to the subordinate devices are all abnormal; and
    in a case that the SCSI protocol identifiers of the subordinate devices are not all null, determine that the links corresponding to the subordinate devices are not all abnormal.

On the basis of the above-mentioned embodiment, the apparatus further includes:
    an ending module configured to, when the global identification number is null or the connection information is not successfully acquired, end a process of cleaning residual paths on a host end.

On the basis of the above-mentioned embodiment, the apparatus further includes:
    a third acquisition module configured to acquire manufacturer information of the subordinate devices; and
    a supplier determination module configured to determine, according to the manufacturer information, whether a supplier of the subordinate devices is a target supplier; in a case that the supplier of the subordinate devices is the target supplier, perform the step that device information of subordinate devices of a plurality of paths is acquired and subsequent steps; and in a case that the supplier of the subordinate devices is not the target supplier, end the process of cleaning residual paths on a host end.

According to the apparatus for cleaning residual paths on a host end in the present application, when it is determined that the links of the subordinate devices of the plurality of paths are abnormal, the mapping state of the volume and the mapped host are further queried from the storage system, and the plurality of paths and the subordinate devices are deleted only when it is determined that the volume is not in the mapping state or even if the volume is in the mapping state, the mapped host is not the target host, and thus, false deletion caused by temporary link failure may be avoided, and the safety and reliability of deleting the plurality of paths and the subordinate devices are ensured.

Figure 3:
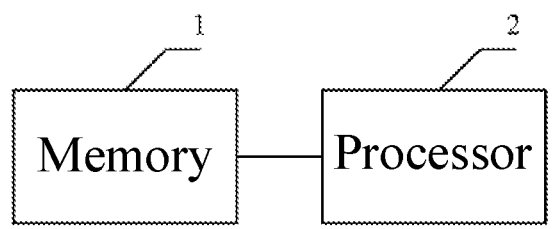
FIG. 3 is a schematic diagram of a device for cleaning residual paths on a host end according to an embodiment of the present application.

The present application further provides a device for cleaning residual paths on a host end. Refer to FIG. 3, the device includes a memory 1 and a processor 2.

The memory 1 is configured to store a computer program; and

The processor 2 is configured to implement, when executing the computer program, the following steps:
    device information of subordinate devices of a plurality of paths is acquired; it is determined, according to the device information, whether links corresponding to the subordinate devices are all abnormal; a global identification number and connection information of each subordinate device are acquired in a case that the links corresponding to the subordinate devices are all abnormal; when the global identification number is not null and the connection information is successfully acquired, a mapping state of a volume corresponding to the global identification number and a mapped host are queried according to the global identification number and the connection information; and when the volume is not in the mapping state or the mapped host is not a target host, the plurality of paths and the subordinate devices are deleted.

The introduction for the device provided by the present application refers to the above-mentioned method embodiment, the descriptions thereof are omitted in the present application.

The present application further provides a non-transitory computer-readable storage medium, having stored thereon, a computer program when, when executed by a processor, implements the following steps:
    device information of subordinate devices of a plurality of paths is acquired; it is determined, according to the device information, whether links corresponding to the subordinate devices are all abnormal; a global identification number and connection information of each subordinate device are acquired in a case that the links corresponding to the subordinate devices are all abnormal; when the global identification number is not null and the connection information is successfully acquired, a mapping state of a volume corresponding to the global identification number and a mapped host are queried according to the global identification number and the connection information; and when the volume is not in the mapping state or the mapped host is not a target host, the plurality of paths and the subordinate devices are deleted.

The non-transitory computer-readable storage medium may include various media, such as a U disk, a mobile hard disk, a read-only memory (ROM), a random access memory (RAM), a diskette or an optical disk, capable of storing program codes.

The introduction for the non-transitory computer-readable storage medium provided in the present application refers to the above-mentioned method embodiment, the descriptions thereof are omitted in the present application.

All the embodiments in the description are described in a progressive way, the same or similar parts among all the embodiments may refer to each other, and the emphasis in each of the embodiments will focus on differences from other embodiments. Particularly, because the apparatus, device and non-transitory computer-readable storage medium disclosed in the embodiments correspond to the method disclosed in the embodiment, the description thereof is relatively simple, and for relevant parts, reference may be made to the description for the method.

Those skilled in the art may further realize that the units and algorithm steps in all examples described in conjunction with the embodiments disclosed in the present application may be implemented by electronic hardware, computer software or a combination of both. In order to describe the interchangeability of the hardware and the software clearly, constitution and steps of all the examples have been described generally in the above description according to functions. Whether these functions are implemented by hardware or software depends upon specific applications and design constraints of the technical solutions. The skilled in the art may adopt different methods to achieve the described functions in each specific application, which, however, should be considered as falling within the scope of the present application.

The steps of the method or algorithm described in conjunction with the embodiments disclosed in the present application may be directly performed by hardware, a software module executed by a processor or a combination of both. The software module may be disposed in a random access memory (RAM), an internal memory, a read-only memory (ROM), an electrically programmable ROM, an electrically erasable programmable ROM, a register, a hard disk, a removable disk, a CD-ROM, or any other form of storage medium known in the technical field.

The method, apparatus and device for cleaning residual paths on a host end, and the non-transitory computer-readable storage medium provided in the present application have been introduced above in detail. The principle and implementations of the present application have been described by applying specific examples in the present application, and the description for the above-mentioned embodiments is only intended to help the understanding of the method and a core concept thereof in the present application. It should be noted that those of ordinary skill in the art may make several improvements and modifications on the present application without departing from the principle of the present application, and these improvements and modifications also fall within the protection scope of the claims of the present application.

The invention claimed is:

1. A method for cleaning residual paths on a host end, comprising:
    acquiring device information of subordinate devices of a plurality of paths;
    determining, according to the device information, whether links corresponding to the subordinate devices are all abnormal;
    acquiring a global identification number and connection information of each subordinate device in a case that the links corresponding to the subordinate devices are all abnormal;
    when the global identification number is not null and the connection information is successfully acquired, querying a mapping state of a volume corresponding to the global identification number and a mapped host according to the global identification number and the connection information; and
    when the volume is not in the mapping state or the mapped host is not a target host, deleting the plurality of paths and the subordinate devices.

2. The method for cleaning residual paths on a host end according to claim 1, wherein the step of acquiring device information of subordinate devices of a plurality of paths comprises:
    acquiring device states of the subordinate devices of the plurality of paths.

3. The method for cleaning residual paths on a host end according to claim 2, wherein the step of determining, according to the device information, whether links corresponding to the subordinate devices are all abnormal comprises:
    determining whether the device states of the subordinate devices are all abnormal;
    in a case that the device states of the subordinate devices are all abnormal, determining that the links corresponding to the subordinate devices are all abnormal; and
    in a case that the device states of the subordinate devices are not all abnormal, determining that the links corresponding to the subordinate devices are not all abnormal.

4. The method for cleaning residual paths on a host end according to claim 1, wherein the step of acquiring device information of subordinate devices of a plurality of paths comprises:
    acquiring small computer system interface (SCSI) protocol identifiers of the subordinate devices of the plurality of paths.

5. The method for cleaning residual paths on a host end according to claim 3, wherein the step of determining, according to the device information, whether links corresponding to the subordinate devices are all abnormal comprises:
    determining whether the SCSI protocol identifiers of the subordinate devices are all null;
    in a case that the SCSI protocol identifiers of the subordinate devices are all null, determining that the links corresponding to the subordinate devices are all abnormal; and
    in a case that the SCSI protocol identifiers of the subordinate devices are not all null, determining that the links corresponding to the subordinate devices are not all abnormal.

6. The method for cleaning residual paths on a host end according to claim 1, further comprising:
    when the global identification number is null or the connection information is not successfully acquired, ending a process of cleaning residual paths on a host end.

7. The method for cleaning residual paths on a host end according to claim 1, wherein before the step of acquiring device information of subordinate devices of a plurality of paths, the method further comprises:
    acquiring manufacturer information of the subordinate devices;
    determining, according to the manufacturer information, whether a supplier of the subordinate devices is a target supplier;
    in a case that the supplier of the subordinate devices is the target supplier, performing the step of acquiring device information of subordinate devices of a plurality of paths and subsequent steps; and
    in a case that the supplier of the subordinate devices is not the target supplier, ending the process of cleaning residual paths on a host end.

8. The method for cleaning residual paths on a host end according to claim 1, wherein the device information is information capable of reflecting link states of the subordinate devices.

9. The method for cleaning residual paths on a host end according to 1, wherein the step of acquiring device information of subordinate devices of a plurality of paths comprises:
    acquiring device states and SCSI protocol identifiers of the subordinate devices of the plurality of paths.

10. The method for cleaning residual paths on a host end according to 9, wherein the step of determining, according to the device information, whether links corresponding to the subordinate devices are all abnormal comprises:

determining whether the device states of the subordinate devices are all abnormal and the SCSI protocol identifiers of the subordinate devices are all null; and in a case that the device states of the subordinate devices are all abnormal and the SCSI protocol identifiers of the subordinate devices are all null, determining that the links corresponding to the subordinate devices are all abnormal.

11. A device for cleaning residual paths on a host end, comprising:

a memory configured to store a computer program; and a processor configured to implement, when executing the computer program, operations comprising:

acquiring device information of subordinate devices of a plurality of paths;

determining, according to the device information, whether links corresponding to the subordinate devices are all abnormal;

acquiring a global identification number and connection information of each subordinate device in a case that the links corresponding to the subordinate devices are all abnormal;

when the global identification number is not null and the connection information is successfully acquired, querying a mapping state of a volume corresponding to the global identification number and a mapped host according to the global identification number and the connection information; and when the volume is not in the mapping state or the mapped host is not a target host, deleting the plurality of paths and the subordinate devices.

12. The device for cleaning residual paths on a host end according to claim 11, wherein the operation of acquiring device information of subordinate devices of a plurality of paths comprises:

acquiring device states of the subordinate devices of the plurality of paths.

13. The device for cleaning residual paths on a host end according to claim 12, wherein the operation of determining, according to the device information, whether links corresponding to the subordinate devices are all abnormal comprises:

determining whether the device states of the subordinate devices are all abnormal;

in a case that the device states of the subordinate devices are all abnormal, determining that the links corresponding to the subordinate devices are all abnormal; and in a case that the device states of the subordinate devices are not all abnormal, determining that the links corresponding to the subordinate devices are not all abnormal.

14. The device for cleaning residual paths on a host end according to claim 11, wherein the operation of acquiring device information of subordinate devices of a plurality of paths comprises:

acquiring small computer system interface (SCSI) protocol identifiers of the subordinate devices of the plurality of paths.

15. The device for cleaning residual paths on a host end according to claim 14, wherein the operation of determining, according to the device information, whether links corresponding to the subordinate devices are all abnormal comprises:

determining whether the SCSI protocol identifiers of the subordinate devices are all null;

in a case that the SCSI protocol identifiers of the subordinate devices are all null, determining that the links corresponding to the subordinate devices are all abnormal; and in a case that the SCSI protocol identifiers of the subordinate devices are not all null, determining that the links corresponding to the subordinate devices are not all abnormal.

16. The device for cleaning residual paths on a host end according to claim 11, wherein the operations further comprise:

when the global identification number is null or the connection information is not successfully acquired, ending a process of cleaning residual paths on a host end.

17. The device for cleaning residual paths on a host end according to claim 11, wherein before the operation of acquiring device information of subordinate devices of a plurality of paths, the method further comprises:

acquiring manufacturer information of the subordinate devices;

determining, according to the manufacturer information, whether a supplier of the subordinate devices is a target supplier;

in a case that the supplier of the subordinate devices is the target supplier, performing the step of acquiring device information of subordinate devices of a plurality of paths and subsequent steps; and in a case that the supplier of the subordinate devices is not the target supplier, ending the process of cleaning residual paths on a host end.

18. The device for cleaning residual paths on a host end according to claim 11, wherein the device information is information capable of reflecting link states of the subordinate devices.

19. A non-transitory computer-readable storage medium, wherein the non-transitory computer-readable storage medium, having stored thereon, a computer program when, when executed by a processor, implements operations comprising:

acquiring device information of subordinate devices of a plurality of paths;

determining, according to the device information, whether links corresponding to the subordinate devices are all abnormal;

acquiring a global identification number and connection information of each subordinate device in a case that the links corresponding to the subordinate devices are all abnormal;

when the global identification number is not null and the connection information is successfully acquired, querying a mapping state of a volume corresponding to the global identification number and a mapped host according to the global identification number and the connection information; and when the volume is not in the mapping state or the mapped host is not a target host, deleting the plurality of paths and the subordinate devices.

20. The non-transitory computer-readable storage medium according to claim 19, wherein, the operation of acquiring device information of subordinate devices of a plurality of paths comprises:

acquiring device states of the subordinate devices of the plurality of paths.

* * * * *